United States Patent [19]
Landry

[11] Patent Number: 5,931,891
[45] Date of Patent: Aug. 3, 1999

[54] DIGITAL FREQUENCY SYNTHESIZER

[76] Inventor: Michael William Landry, 132 Candy La., Encinitas, Calif. 92024

[21] Appl. No.: 08/932,769

[22] Filed: Sep. 18, 1997

[51] Int. Cl.$^6$ .................................................. H03B 19/14
[52] U.S. Cl. ............................................................ 708/271
[58] Field of Search ................................ 364/718.02, 721

[56] References Cited

U.S. PATENT DOCUMENTS

| | | | |
|---|---|---|---|
| 3,657,657 | 4/1972 | Jefferson | 364/721 |
| 3,882,403 | 5/1975 | Gerken | 328/14 |
| 4,328,554 | 5/1982 | Mantione | 364/721 |
| 4,486,846 | 12/1984 | McCallister | 364/607 |
| 4,905,177 | 2/1990 | Weaver | 364/721 |
| 5,117,231 | 5/1992 | Yaron | 364/721 |
| 5,202,846 | 4/1993 | Rasmussen et al. | 364/721 |
| 5,412,338 | 5/1995 | Richards et al. | 364/221 |

OTHER PUBLICATIONS

Crawford, J. A. "Frequency Synthesizer Design Handbook", 1994, Artech House, pp. 308–346.

*Primary Examiner*—David H. Malzahn
*Attorney, Agent, or Firm*—Michael W. Landry

[57] ABSTRACT

A digital frequency synthesizer for generating square wave signals employing a phase accumulator, triangle wave logic function, smoothing filter, and hard limiter. A triangle wave logic function simplifies the implementation of stable square wave signals.

2 Claims, 6 Drawing Sheets

DIGITAL FREQUENCY SYNTHESIZER

TECHNICAL FIELD

This invention relates generally to signal generation and specifically to digital frequency synthesis.

BACKGROUND

Fixed frequency and modulated signals are commonly needed in electronic and communication systems. A variety of methods are employed for generation of such signals, including phase locked loops (PLL) and direct digital synthesis (DDS) and many variations upon these methods.

Figure 1:
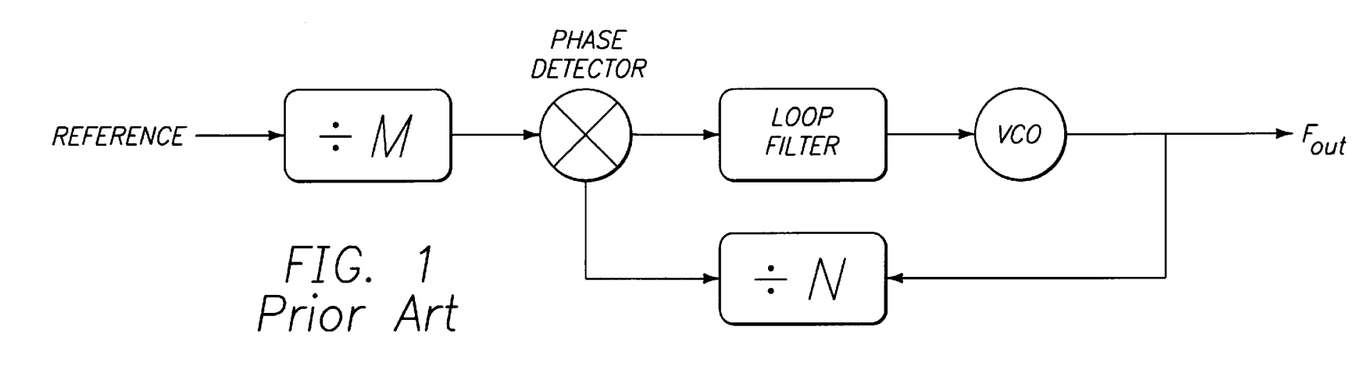
FIG. 1 shows a block diagram of a prior art phase locked loop frequency generator.

A typical PLL system, shown in FIG. 1, will use a voltage controlled oscillator (VCO), feedback divider, phase detector, loop filter, and reference clock to generate a constant frequency signal. This system is agile in that the output frequency can be programmed in discrete steps by changing the reference divider and the feedback divider. The limitation of this approach is that only discrete frequency steps are available, the size of the steps being a function of the range of the reference and feedback divider.

Many variations of the basic PLL architecture are well known that improve on frequency resolution and spectral purity including fractional-N frequency synthesis and multiple-loop approaches.

Figure 2:
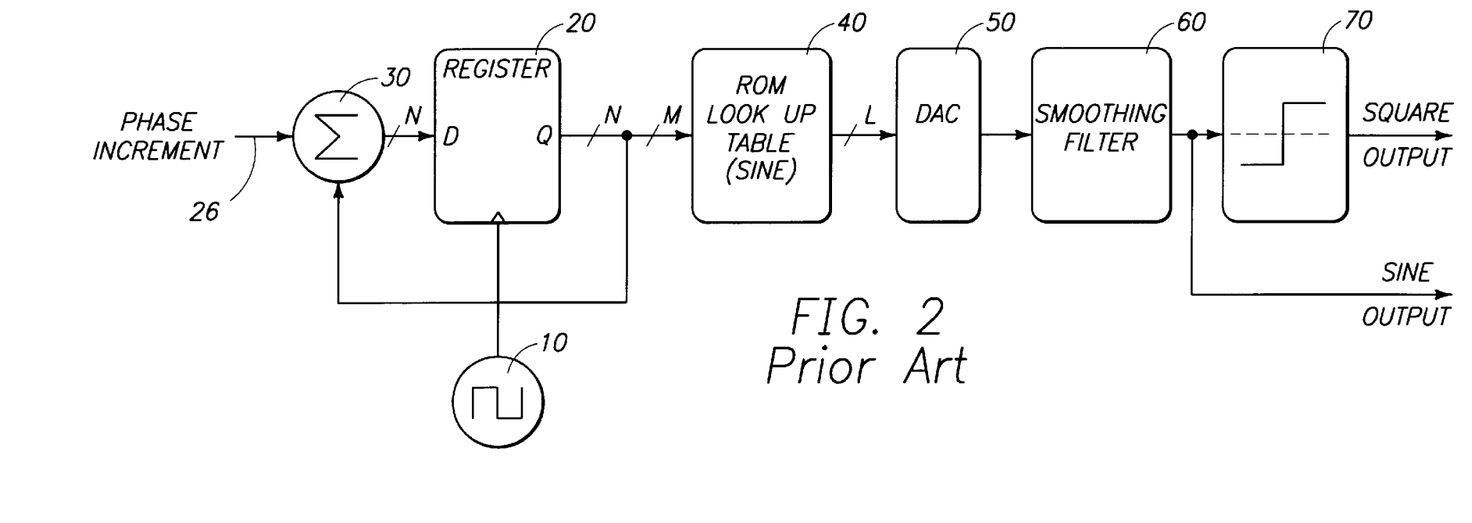
FIG. 2 shows a block diagram of a prior art direct digital synthesis frequency generator.

A typical DDS system, shown in FIG. 2, will use a fixed reference clock, a phase accumulator, sine look-up table, digital to analog converter, and smoothing filter to generate a constant frequency signal. This system is also agile, with the frequency steps being a function of the length of the phase accumulator register and the reference clock. Generally, a DDS approach offers fine resolution in setting the output frequency. There are many variations on this approach, including mechanisms to increase spectral purity.

Direct digital synthesizers are described by Crawford, J. A., *Frequency Synthesizer Design Handbook,* Artech House, Inc. Norwood Mass. 1994. This reference also provides some treatment of the issues in DDS design.

An advantage of the DDS frequency generation over the PLL approach is that the DDS is mostly digital, offers improved frequency resolution, and avoids the stability issues of the PLL.

Figure 3:
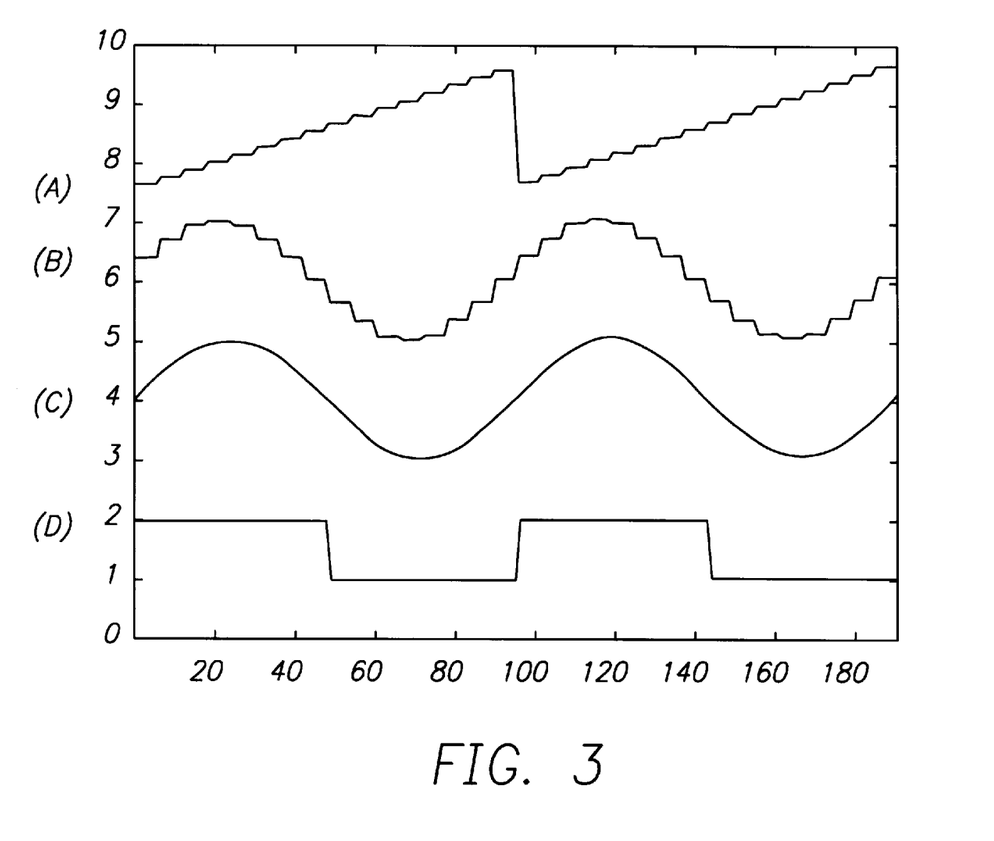
FIG. 3 contains waveforms at specific signal points in the prior art DDS frequency generator.

Referring again to FIG. 2, reference clock 10 causes phase accumulation register 20 to latch the value of summer 30 which adds a phase increment value 26 to the previous output value of phase accumulation register 20. In this manner, each reference clock period causes the phase value output by the phase accumulation register 20 to increase linearly, creating a phase ramp. The rate of increase in the phase accumulator value is determined by the phase increment value. The phase accumulator value will increase until the maximum value is reached, then the value will rollover to the minimum value, thus a sawtooth shaped waveform is produced, as shown in waveform A of FIG. 3. The function combining a summer, phase accumulation register and phase increment value is commonly referred to as a numerically controlled oscillator (NCO).

Phase increment 26 is computed using the following formula:

$$Pinc = 2^N * Fout/Fref$$

were:
Pinc is the phase increment value applied to the NCO,
N is the number of bits in the phase accumulation register,
Fout is the desired output frequency,
Fref is the reference frequency.

The phase accumulator value is applied to sine wave lookup table 40 which converts the phase value to an amplitude value. This sine wave lookup table is generally implemented using a read only memory (ROM) which stores the sine trigonometric function. A phase value applied of X is translated to an amplitude value sine(X). Lookup table 40 maps the full scale of the phase value output by the NCO to one cycle of a sine wave. As the phase value increases from 0 to full scale, one sine wave cycle will be generated.

In order to provide fine frequency resolution, the phase accumulation register 20 is set to a large value, such as 32 or 48 bits. The entire phase accumulation register output is not applied to the sine mapping table, instead only a few of the most significant bits are applied, typically 8 to 14 bits. With each additional bit applied to the sine lookup table the number of memory locations doubles. The number of bits is limited by practical consideration of the size of the lookup table.

Additionally, the number of bits of output from the lookup table is similarly limited, typically 8 to 12 bits. A compromise is made between complexity and cost of the lookup table and the degradation of the signal generated. The existence of the sine lookup table and the compromise resulting from truncation of the input and output precision are significant design issues in a DDS system.

The output of the lookup table, which represents discrete amplitude levels of the desired sine wave, is applied to a digital to analog converter 50 (DAC). The voltage output of the DAC changes in discrete steps based on the digital value supplied by the lookup table, as shown in waveform B of FIG. 3. Generally such steps are undesirable because they contain the high frequency content of the reference clock. A smoothing filter 60 is used to attenuate the high frequency content and result in smooth transition between steps, as shown in waveform C of FIG. 3. The signal is relatively pure spectrally, since the time domain waveform is sinusoidal and thus contains a fundamental and no harmonics.

The basic DDS system generates a sinusoidal waveform. Often a square wave signal is desired, for example when driving digital logic. In this case a hard limiter 70 is used to square the signal and generate the appropriate high and low logic levels. The hard limiter changes state when the sine wave crosses the threshold level. With the threshold set at the zero level, a high level is output when the sine wave is above the threshold, and a low logic is output then the sine wave is below the threshold. The square wave thus changes level at the zero crossing in the sine wave, as shown in waveform D of FIG. 3.

Although the final signal generated is a digital square wave with only two amplitude levels, the phase accumulator output must be processed by the sine lookup table, smoothing filter, and hard limiter to obtain acceptable square wave properties. The smoothing filter acts to interpolate the zero crossing point between discrete amplitude levels generated by the sine lookup table. The square wave thus can have a constant period and good symmetry that are not available when using the signals directly from the phase accumulator.

The sawtooth wave from the phase accumulator cannot be used directly because the period modulates due to the finite precision of the phase increment and discrete nature of the phase steps. The zero crossings do not occur at fixed intervals, instead they vary between two intervals of K and K+1, where K is an integer multiple of the reference clock period. If the smoothing filter is applied to the phase, the zero crossing in the positive direction is interpolated, but the time of the zero crossing in the negative direction is not interpolated because the slope is vertical due to the discontinuity as the phase accumulator rolls over.

The use of a sine lookup table in conventional DDS systems increases cost, power, and size. Much effort has been directed towards making sine lookup tables more efficient. One example is disclosed in U.S. Pat. No. 4,486,846 to McCallister et al (1984) which describes using quadrant replication for reducing the memory storage requirements. U.S. Pat. No. 4,905,177 to Weaver et al (1990) describes an efficient manner of converting phase to sine amplitude.

U.S. Pat. No. 3,882,403 to Gerken (1975) describes a digital frequency synthesizer without a sine lookup table but has the disadvantage of requiring a voltage controlled oscillator and multiple DACs.

U.S. Pat. No. 4,328,554 to Mantione (1982) describes a frequency synthesizer without a sine lookup table. An NCO architecture is used, with the MSB of the NCO driving an up/down counter to generate a triangle wave shape which is then shaped to a sine wave. This system results in a sine wave. Although not disclosed in Mantione, the sine wave which could then be converted to a square wave using a hard limiter. The first disadvantage of this approach is the complexity of two stages of conversion: phase to triangle conversion then triangle to sine conversion. Another disadvantage is the use of only the MSB of the phase accumulator to generate the triangle wave, since the period of the MSB had period modulation as described above. Another disadvantage is the use of an up/down counter for triangle wave conversion since this counter divides down the NCO frequency and thus limits the highest frequency of operation. Another disadvantage is the imprecision of the diode clipping sine shaper.

Since the amplitude information contained in the sine lookup table is removed when the DDS system is generating a square wave, it is wasted. The harmonic purity of a sinusoidal waveform at an intermediary stage is not needed since the final square wave necessarily contains odd harmonics. Simple elimination of the sine lookup table results in unacceptable square wave properties, specifically the period will be modulated. A more efficient approach to generating square waves with a DDS is needed that avoids a sine lookup table.

SUMMARY OF THE INVENTION

This invention is directed to efficiently generating square wave signals using a DDS. According to the invention, a triangle wave is generated from the phase accumulator value, which is then applied to the DAC and smoothing filter to produce a linear ramp for both positive and negative directions in the region of the hard limiter threshold. According to the invention, a triangle wave can be efficiently generated from the sawtooth waveform output of the phase accumulator by logic operations. Conversion to sine waves and a sine lookup table is avoided.

The triangle wave has important properties related to its use in the square wave signal application. First, the triangle wave, after smoothing, has gradual linear slope crossing zero in both the positive and negative direction. Near the threshold of the hard limiter the triangle wave behaves similar to the sine wave. This facilitates the use of the hard limiter to create a clean square wave. The sawtooth wave direct from the phase accumulator output has gradual slope crossing in only one direction, but in the negative direction the crossing is abrupt and varies directly as the period modulates.

Second, the triangle wave and square wave are similar in that they both contain only odd harmonics. Since the desired square wave output will have odd harmonics, the presence of the odd harmonics in the triangle wave does not present a problem. The absence of harmonic content in the sine wave provides no advantage.

A feature of the invention is to provide square wave frequency generation from a DDS system.

Another feature of the invention is to provide square wave frequency generation without the use of a lookup table.

Another feature of the invention is to provide an efficient triangle wave generator.

These and other features of the invention will become more apparent from the following description of an embodiment considered together with the drawings.

DETAILED DESCRIPTION OF THE INVENTION AND BEST MODE FOR CARRYING OUT THE INVENTION

Figure 4:
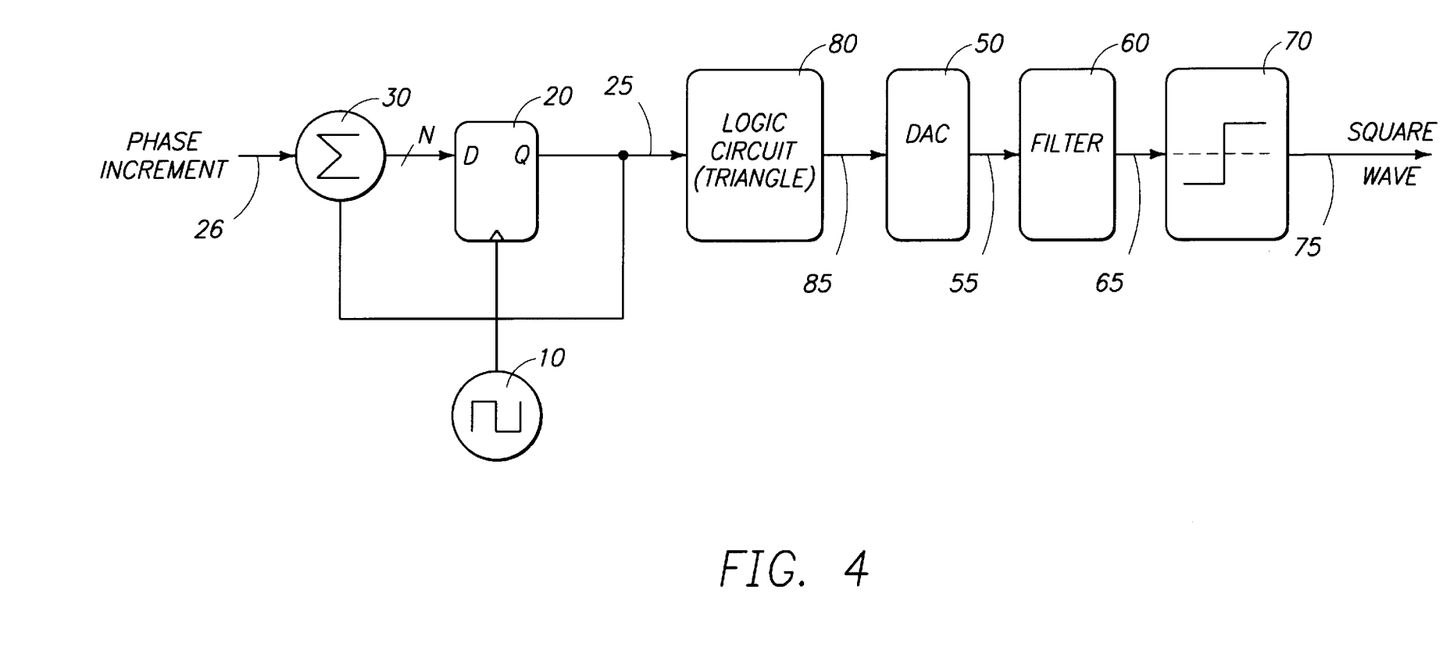
FIG. 4 shows a block diagram of a frequency generator in accordance with the present invention.

Referring to FIG. 4, reference clock 10, phase increment 26, summer 30, and phase accumulation register 20 operate as an NCO in the same manner as the prior art. According to the present invention, digital phase output 25 from the register 20 is applied to logic circuit 80 which converts the sawtooth shaped digital phase signal 25 to a triangle wave shaped digital signal 85.

Triangle wave 85 has discrete amplitude steps, the resolution of the steps is determined by the number of bits selected from phase output 25 that are processed by logic circuit 80. Increasing the number of bits selected has minimal impact on the size and complexity of the logic function since the logic grows linearly with the number of bits, not exponentially as with a lookup table. Triangle wave 85 changes value at discrete time intervals equal to the reference clock 10 period.

The discrete nature of the time intervals when digital triangle wave 85 changes amplitude value is the dominant limiting factor in the quality of the final square wave output signal. If this signal 85 is directly converted to a square wave significant impairments will be present. These impairments will be evident as jitter in the time domain or phase noise in the frequency domain.

Digital triangle wave signal 85 is converted to an analog signal by DAC 50. DACs are well known. For application in the present invention, DAC 50 can be implemented using a resistor ladder, current switches, or other known techniques.

The analog signal 55 still has discrete time and discrete amplitude properties. Because of the discrete time property, in general, the exact period desired for the generated signal can not be achieved every cycle, rather the period dithers between two values differing by one reference clock period. The average period will be determined by the phase increment value. The precision of the frequency that is output will be determined by the number of phase accumulator bits. Only where the desired period is an integer multiple of the reference clock period the signal will have a constant period, but for a general purpose digital frequency synthesizer any relationship between reference clock and output frequency must be achievable.

Filter 60 removes the discrete time and amplitude properties by smoothing the signal. Filter 60 connects the discrete points in the signal 55 by smooth transitions. The significant property of the filter output signal 65 after filtering, for purposes of the present invention, is that the points where signal 65 crosses zero becomes a continuous function. In the continuous time domain, the zero crossings occur at interpolated points between the discrete time and amplitude values. Accordingly, the period of the filter output signal 65 can be constant, it does not dither between two different periods.

Filter 60 is a low pass filter and can be implemented using known techniques. For application in the present invention filter 60 can be implemented using a lumped element passive inductor-capacitor (L-C) or resistor-capacitor (R-C) filter, R-C active filtering techniques, SAW filter, distributed element filters, or other known filtering techniques. The cutoff frequency of filter 60 is determined by the frequency of reference clock 10. The filter should significantly attenuate the reference clock while passing the fundamental frequency generated by the frequency synthesizer. Accordingly, the cutoff frequency is set below the reference clock and above the highest synthesizer output frequency desired. As these two frequencies become closer, the slope of the filter must be steeper, and therefore the order must be higher.

Filtered signal 65 is then converted to a square wave by hard limiter 70. The hard limiter 70 output responds in a nonlinear fashion to changes in the input signal. When the input signal is above the threshold, generally set at zero, the hard limiter 70 output is high. When the input signal is below the threshold the output is low. The high and low levels can be set at amplitudes corresponding to digital logic levels for the particular circuit application. Hard limiters are well known, and are generally constructed using a high gain device that amplifies the difference between two inputs, one input being the threshold the other being the signal. An example of a hard limiter is a comparator. Positive feedback hysteresis would be introduced in the comparator circuit to ensure that a single output transition results at each zero crossing of the filtered triangle wave signal. The hysteresis would be set to a value in excess of the noise present in the signal processing, including harmonic and phase noise in the filtered signal 65, to avoid multiple transitions at the zero crossing.

Figure 5:
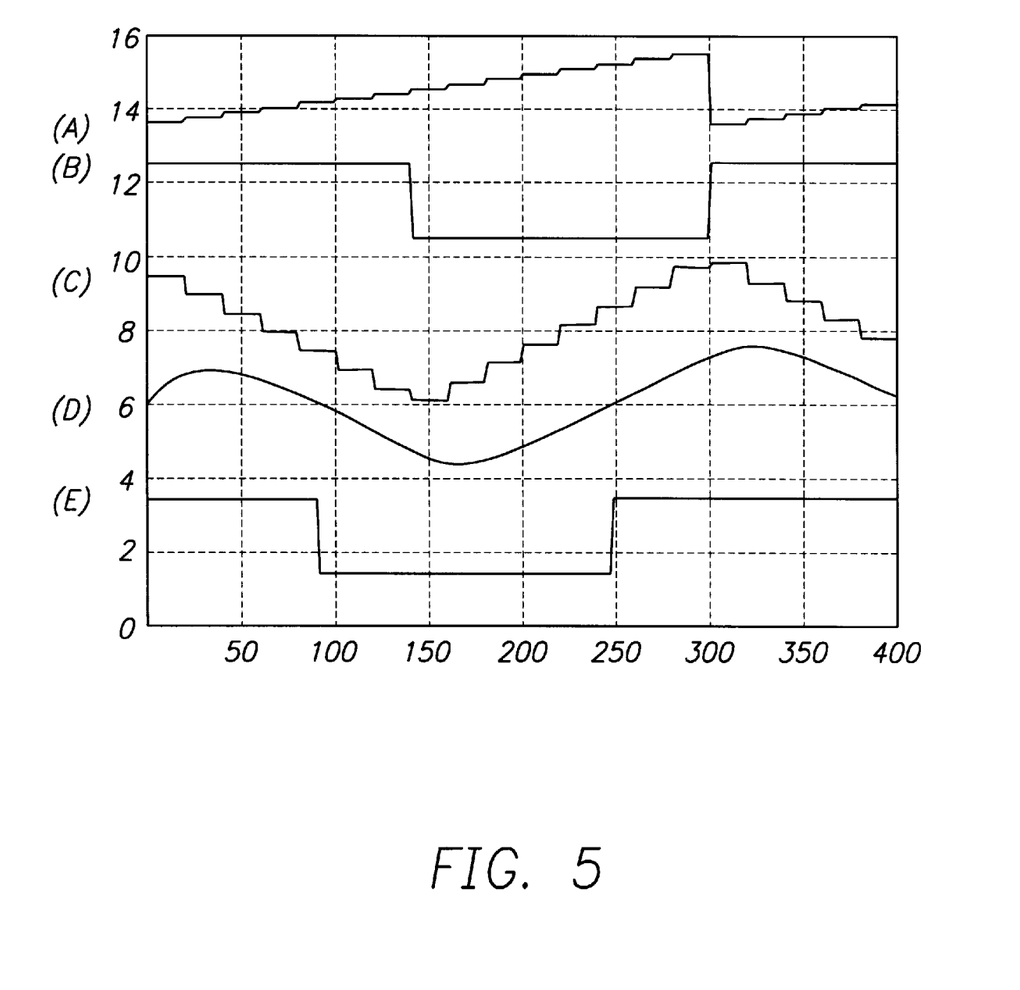
FIG. 5 contains waveforms at specific signal points in the frequency generator in accordance with the present invention.

FIG. 5 shows waveforms at specific points in the signal processing path of the frequency synthesizer according to the present invention. Waveform A of FIG. 5 shows a representation of the digital value at phase accumulator output 25. Waveform B of FIG. 5 shows the most significant bit of the phase value. Waveform C of FIG. 5 shows a representation of the discrete amplitude and discrete time digital signal 85 output by the triangle wave logic circuit 80. Waveform D of FIG. 5 shows the signal output 65 from the filter 60. Waveform E of FIG. 5 shows the final square wave signal 75 output from hard limiter 70.

Figure 7:
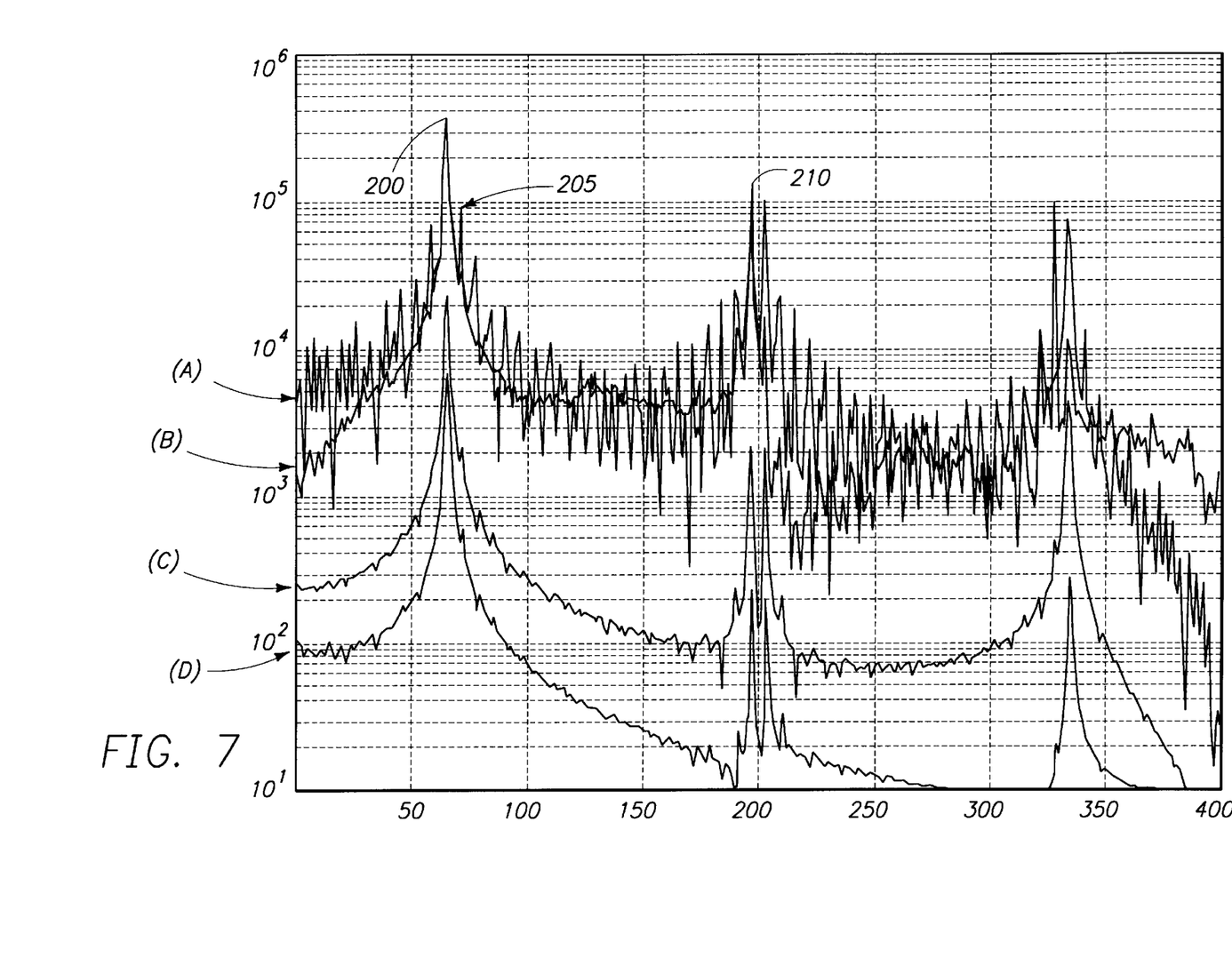
FIG. 7 shows spectrum plots of waveforms generated in accordance with the present invention.

FIG. 7 shows spectral plots of the waveforms at specific points in the signal processing path of the frequency synthesizer according to the present invention. Plot A of FIG. 7, shown as dotted lines for clarity, shows the frequency spectrum of the most significant bit of the phase value, corresponding to square wave waveform B of FIG. 5. Plot A of FIG. 7 shows significant distortion of the spectral purity of the waveform, such as spur 205, which is not visible in the time domain waveform A of FIG. 5. This distortion is the result of the dithering of the period of the most significant bit. Peak 200 is the fundamental of the signal generated by the frequency synthesizer.

Plot B of FIG. 7, shown as a solid line for clarity, shows the frequency spectrum of the square wave output 75 from the hard limiter 70. The fundamental is at peak 200 and the third harmonic is at peak 210. Other spectral peaks are significantly attenuated compared to the spectrum of Plot A of FIG. 7.

Plot C of FIG. 7 shows the spectrum of the digital triangle waveform 85. Plot D of FIG. 7 show the spectrum of the analog triangle wave signal 65 after filtering.

Figure 6:
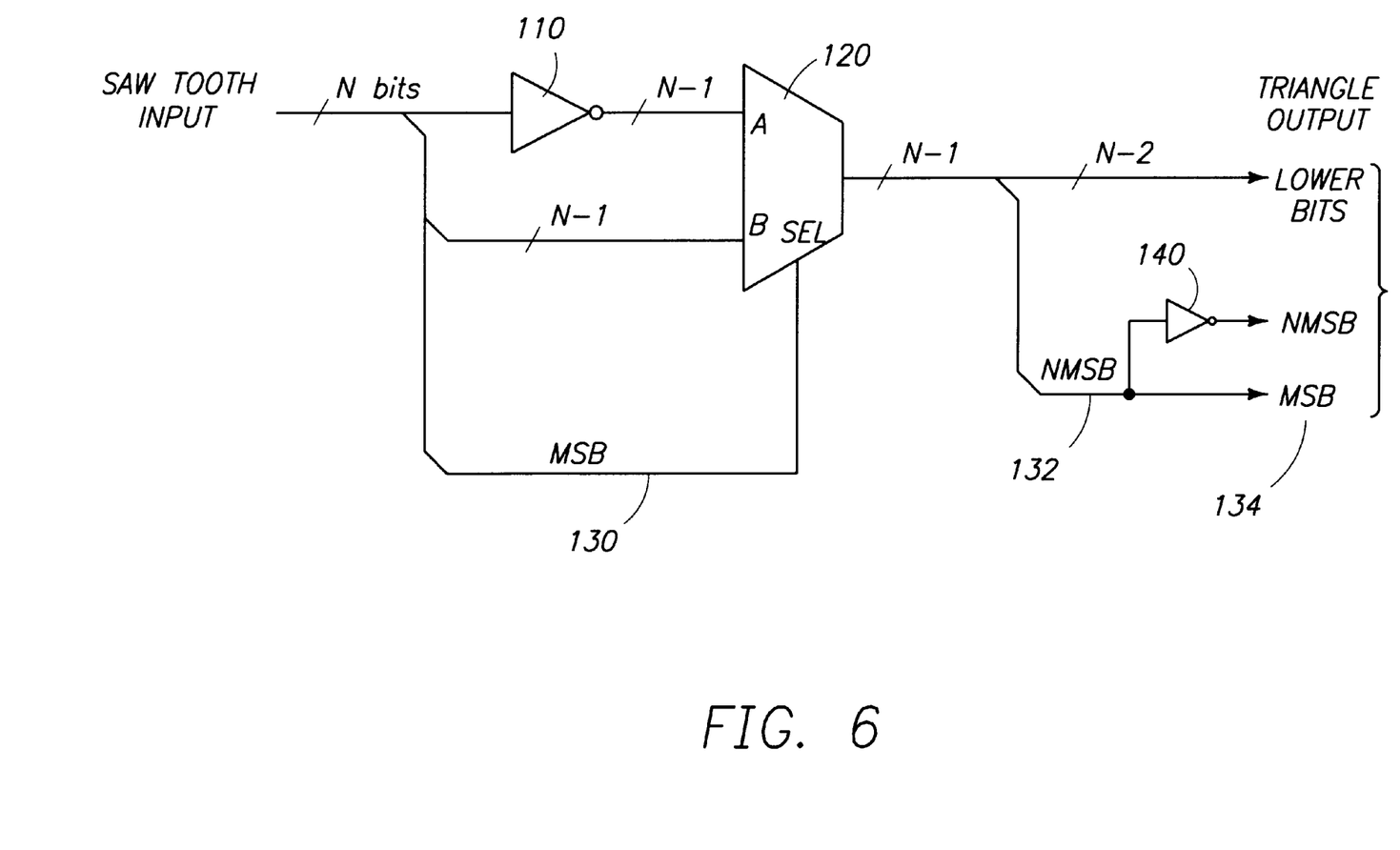
FIG. 6 shows a block diagram of a triangle wave generator in accordance with the present invention.

Triangle wave logic circuit 80 can be implemented with digital logic, for example as shown in FIG. 6. N bits of digital information representing the amplitude value of the phase are processed. The process is to invert all values below one half full scale, then to subtract one quarter of the full scale value. The one quarter scale shift is performed to keep the signal swing centered around the one half scale value.

The level of most significant bit (MSB) 130 determines if the value if above or below mid scale. A bank of inverters 110 generates the complement of each bit. A data selector or multiplexer 120 selects from the true and complement version of the input. If MSB 130 is low, input A is selected which passes the complement signals to the multiplexer output. If MSB 130 is high, input B is selected which passes the true signals to the multiplexer output. Only N-1 bits need be inverted since MSB 130 after inverting the lower half of the scale would always be high, thus is does not need to be inverted.

Next to most significant bit (NMSB) 132 output from data selector 120 is the upper bit of the N-1 data bits passing through the data selector 120.

Subtraction of one quarter full scale can be accomplished with a logic function. Since a binary counting sequence repeats the lower bits each one quarter interval, only the upper bits need be altered to effect the subtraction. Subtracting one from the upper two bits will result in a one quarter full scale subtraction. A two bit subtracter operating on the upper two bits can perform this operation. The operation is simplified further in the triangle function logic because the MSB is always a logic level one. Referring to FIG. 6 again, the one quarter subtraction can be performed by shifting the NMSB 132 to the MSB position and inverting NMSB 132 value with an inverter 140. Accordingly, the number of bits output by the triangle function logic is the same as the number of bits input. MSB 130 is not passed directly to the output; the MSB 134 at the triangle output is taken from NMSB 132.

A new technique has been described for generating high quality square wave signals with minimal circuitry. The invention has been particularly shown and described with respect to preferred embodiments. Changes may be made in detail and remain within the principles and teaching of the invention.

What is claimed is:

1. A digital frequency synthesizer for generating square wave signals comprising:

a reference clock with an output;

a summer having a first input and a second input and an output, said output being the sum of said first input and said second input;

a phase increment value applied to said summer first input;

a register for latching a plurality of bits with a clock input connected to said reference clock output, a data input connected to said summer output, and an output, said output connected to said summer second input and responsive to said data input when said clock input transitions;

a triangle wave logic circuit comprising:

a data input comprising a most significant bit (MSB) and lower bits, said data input connected to said register output;

an inverter bank with an input connected to said data input lower bits, and an output;

a data selector with a first input, second input, output, and select input, said select input connected to said data input MSB, said first input connected to said inverter bank output, said second input connected to said data input lower bits, said output responsive to said select input for selecting between said first input and said second input; and a subtracter with an input connected to said data selector output for subtracting one quarter full scale value from said input, and an output whereby a triangle wave is output from said subtracter output;

a digital to analog converter with a digital input connected to said triangle wave logic circuit output, and an analog output;

a smoothing filter with an input connected to said digital to analog converter analog output, and an output; and a hard limiter with an input connected to said smoothing filter output, and an output;

whereby a square wave is output from said hard limiter at a frequency determined by said reference clock and said phase increment value.

2. A method of digital frequency synthesis comprising the steps of:

calculating a phase increment value;

summing said phase increment value to produce a phase accumulate value;

inverting said phase accumulate values less than one half full scale to create an intermediate value;

subtracting one quarter full scale from said intermediate value to create a digital triangle wave value;

converting said digital triangle wave value to an analog triangle wave;

filtering said analog triangle wave to create a smooth triangle wave; and hard limiting said smooth triangle wave to create a square wave.

* * * * *